United States Patent [19]

Chaney et al.

[11] 4,005,308
[45] Jan. 25, 1977

[54] WELD FILL HEIGHT REGULATING SYSTEM FOR ARC WELDING APPARATUS

[75] Inventors: Elwood Chaney, Peoria; John W. Crayton, Washington, both of Ill.

[73] Assignee: Caterpillar Tractor Co., Peoria, Ill.

[22] Filed: Dec. 23, 1974

[21] Appl. No.: 536,049

[52] U.S. Cl. .................. 219/125 R; 219/131 F
[51] Int. Cl.² ..................................... B23K 9/12
[58] Field of Search ........... 219/131 F, 131 R, 135, 219/137 PS, 124, 125 R, 125 PL

[56] References Cited

UNITED STATES PATENTS

| | | | |
|---|---|---|---|
| 1,392,437 | 10/1921 | Morton | 219/124 |
| 3,233,076 | 2/1966 | Vilkas | 219/131 F |
| 3,261,960 | 7/1966 | Lehnert | 219/131 R X |
| 3,264,447 | 8/1966 | Agnew | 219/131 F |
| 3,267,251 | 8/1966 | Anderson | 219/125 PL |
| 3,373,914 | 3/1968 | Wall, Jr. | 219/125 PL |
| 3,538,376 | 11/1970 | Parker | 219/131 R |
| 3,612,818 | 10/1971 | Bechtle et al. | 219/131 F X |

FOREIGN PATENTS OR APPLICATIONS 312,727 9/1969 U.S.S.R. ................... 219/124

Primary Examiner—J. V. Truhe
Assistant Examiner—Clifford C. Shaw
Attorney, Agent, or Firm—Phillips, Moore, Weissenberger, Lempio & Strabala

[57] ABSTRACT

Means are provided for maintaining a uniform height of deposited weld material in an electrical arc welding apparatus of the kind having a welding head driven by a travel motor along a juncture between two workpieces which are to be joined. A first signal, indicating departure from a desired fill depth, is produced by sensing variation of the welding current from a predetermined normal magnitude. The first signal is applied to summing junction together with a predetermined selectable reference signal of opposite polarity so that the two signals cancel out as long as the desired weld fill height is being maintained. Upon a departure from the desired weld fill height an output signal from the summing junction activates a servomotor which adjusts the speed of the travel motor as necessary to maintain the uniform weld depth. Means are further provided for assuring continuance of the welding head movement in the event that the melt should be lost because of proximity to an edge of the workpiece or because of an opening therein.

4 Claims, 1 Drawing Figure

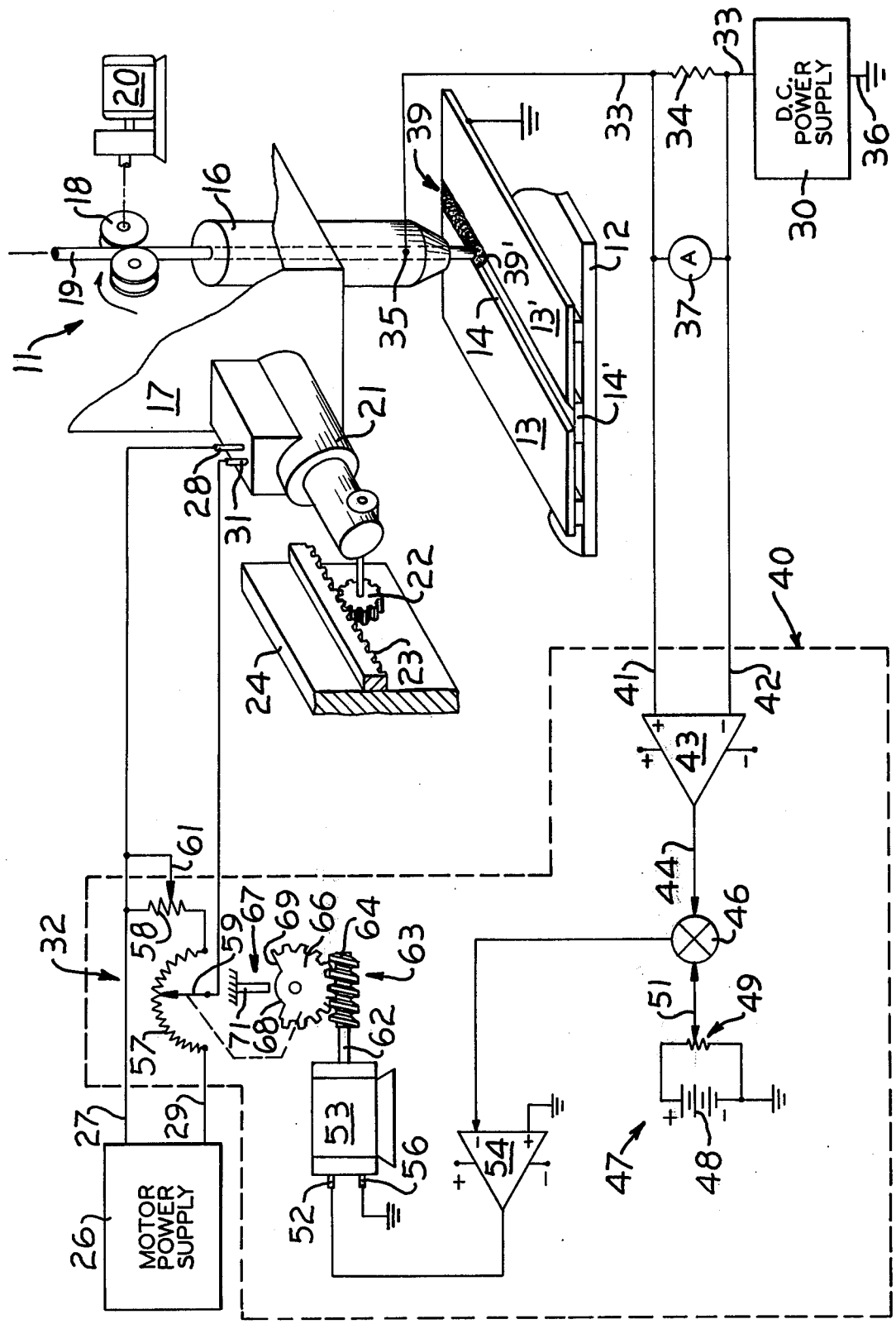

WELD FILL HEIGHT REGULATING SYSTEM FOR ARC WELDING APPARATUS

BACKGROUND OF THE INVENTION

This invention relates to electrical arc welding and more particularly to mechanisms for maintaining a uniform height of deposit of weld material along a seam.

Arc welding is used in the manufacture of diverse different products to join workpieces which are to become an integral element. Typically, the parts to be joined are supported in a welding fixture and a small gap or groove is left therebetween which is to be filled by material melted from a consumable welding electrode or wire by establishing an electrical arc between the electrode and the workpiece. While the adjacent edges of the parts to be joined are shaped, prior to installation in the welding fixture, to establish a weld groove of desired configuration and uniformity, manufacturing tolerances may result in some variation of the actual width of this groove along its length.

The welding head carrying the consumable electrode is moved along the groove, while the electrical arc is present, in order to cause the melting and depositing of material. If the motion of the welding head along the groove, the rate of feeding of the electrode material and the voltage applied between the welding head and workpiece all remain constant, then irregularity in the shape of the groove may cause an unevenness in the height of the weld material which is deposited along the groove. As a consequence, portions of the weld groove may be overfilled while others are underfilled. This has several undesirable effects such as an unevenness in the strength of the weld at various points in the seam and a wastage of welding material. To correct for the problem, costly additional supplementary welding to add material or grinding of the welded part to remove excessive material may be needed.

One known technique for avoiding or at least reducing this problem is simply to have an operator carefully observe the progress of the weld while operating a control which enables him to adjust the amount of material deposited at each stage as might be necessary. This is undesirable in that it generally requires the operator to give his undivided attention to a single welding operation and thereby greatly restricts his productivity. Further, it is not an entirely satisfactory procedure in practice as great difficulty may be encountered in maintaining a uniform welding bead simply by visual observation and manual adjustment of controls.

Accordingly, various systems have heretofore been developed to sense deviation of weld depth from the desired value and to make an automatic corrective adjustment of some parameter of the apparatus. The sensing means have typically included such devices as infrared sensitive devices or photoelectric elements or mechanical probes which ride along the weld groove. In order to make the compensating adjustments in response to the output of the sensing means, the prior systems variously change the rate of feed of electrode material, adjust the height of the welding head above the workpiece, vary the travel of the welding head relative to the workpiece or vary the arc current. Such systems either require costly and complex additions to the basic welding apparatus or else involve the usage of sensing means which are fragile and prone to malfunction or which must physically contact the thermally corrosive environment of the melt pool.

In many cases substantial system complication is also necessary to avoid malfunction in the event that the volume of melted weld material which is being monitored should be lost because of the proximity of an edge of the workpiece being welded or because of passage of the arc across an opening in the workpiece or for some other reason. Under these circumstances the sensors emit a signal which is normally indicative of a decrease in the weld height from the desired norm. In the absence of complex corrective means, the automatic system may then respond with a compensatory increase in the rate of electrode feed or some other parameter which is not in fact needed under the circumstances.

Summary of the Invention

The present invention provides a simple inexpensive and reliable means for automatically assuring deposition of welding material to a uniform fill height along a seam. For this purpose welding arc current is monitored to produce a first signal. This first signal departs from a normal value if the electrical arc length is increased or decreased because of a change in the depth of the weld material being deposited as the welding head moves relative to workpieces which are to be joined. The first signal is applied to a summing junction which also receives a reference signal. The reference signal has the same magnitude that the first signal has when the desired arc length is present but is of opposite polarity. Thus, the two signals cancel out at the summing junction as long as the welding arc length and therefore the weld fill height remains at a predetermined value. If the weld fill height begins to depart from the desired value, arc length changes and arc current changes accordingly. An output signal is then produced at the summing junction which has a polarity indicative of the direction of the incipient departure from desired fill height. The output signal operates servomeans which adjusts the travel rate of the welding head along the seam to compensate for the incipient departure, thereby maintaining the desired uniform fill height of the weld groove.

In a preferred form of the invention, the servomeans adjusts the travel rate of the welding head relative to the workpiece by varying the electrical voltage applied to the travel motor from the motor power supply. To assure that the welding head travel does not stop completely in the event the weld pool of molten material should be lost by draining over an edge of the workpiece or for some other reason, adjustable means are provided to prevent the servosystem from dropping the travel motor voltage below a predetermined minimum.

Accordingly, it is an object of this invention to provide a simplified reliable and relatively inexpensive means for maintaining a predetermined fill height of weld deposit material in an arc weld without requiring continued surveillance and adjustments by an operator.

The invention, together with further objects and advantages thereof will best be understood by reference to the following description of a preferred embodiment taken in conjunction with the accompanying drawing.

BRIEF DESCRIPTION OF THE DRAWING

The accompanying drawing illustrates certain elements of an automatic arc welding installation together with electrical circuit elements for controlling the fill height of weld material which is deposited along a seam.

DESCRIPTION OF A PREFERRED EMBODIMENT

Referring now to the drawing, the fill height control system of the present invention may be applied to an arc welding installation 11 which is otherwise of conventional construction. Accordingly, only certain elements of the welding installation 11 with which the present invention directly coacts, are shown in the drawing, suitable detailed constructions for other portions of the welding apparatus being known to the art.

A welding installation 11 of this kind typically includes a bed 12 for supporting workpieces 13 and 13' which are to be welded together to form an integral element, the weld in this instance being linear. To prepare the two workpieces 13 and 13' for welding, it is customary to form a weld groove 14 by beveling the edges of the two workpieces which are to be joined and by separating the beveled edges a slight distance when the workpieces are positioned on bed 12. To close the bottom of groove 14, a strip 14' of non metallic heat resistant material may be disposed on bed 12 along the underside of the groove and similar strips may be used to support other portions of the workpieces on the bed.

Arc welding installation 11 also includes a welding head 16 supported above the bed 12 by a movable carriage 17. The welding head 16 is spaced above the weld groove 14 and means such as reels 18 driven by a motor 20 are provided for feeding a consumable welding electrode wire 19 through the welding head towards the weld groove 14.

To provide for movement of the welding head 16 along the fill groove 14 as the weld progresses, an electrical travel motor 21 drives a gear 22 which engages a rack 23 that extends along the carriage support member 24. Thus by energizing the travel motor 21, from a motor power supply 26, the carriage 17 and welding head 16 may be caused to travel along groove 14 at a rate determined by the speed of the motor. Motor power supply 26 in this example has an output conductor 27 connected to one terminal 28 of the travel motor and another output conductor 29 connected to another terminal 31 of the travel motor through a variable resistance 32 which will hereinafter be discussed in more detail. However, it may be observed at this point that the speed of motor 21 and thus the travel rate of welding head 16 along fill groove 14 may be controlled by adjustment of the variable resistance 32.

To establish the welding arc, a DC power supply 30 of the type having a regulated constant output voltage has a positive output conductor 33 which is connected to the welding head 16 through a resistor 34 and is connected to the electrode wire within the welding head at a contact 35. Power supply 30 has a negative output conductor 36 electrically connected to the workpieces 13, through a ground connection in this particular example. In accordance with the well-known action of arc welding apparatus, an electrical discharge occurs between the workpieces 13 at fill groove 14 and the adjacent end of electrode wire 19. This melts both the adjacent region of the workpieces and the adjacent end of the welding electrode and causes a deposit of molten material from the electrode to form along the fill groove as the welding head 16 progresses therealong. In prior welding installations resistor 34 is present in the primary welding current circuit in order that a current measuring instrument such as ammeter 37 may be connected across the resistor to monitor the welding current.

The structure of the arc welding installation 11 insofar as it has been described to this point is one example of a conventional system to which the present invention may be applied. It should be understood that the invention is also applicable to other known forms of welding installation such as those wherein the welding head 16 or equivalent means remain stationary while the workbed 12 or the like is travelled by means such as travel motor 21. Similarly, many known arc welding installations provide for additional motions of the welding head 16, such as motion at right angles to that described above and motion towards and away from bed 12, in order to perform nonlinear welds of various configurations. The techniques of the present invention are equally applicable to such systems.

If welding head 16 is travelled along fill groove 14 at a constant speed by motor 21 while arc voltage is constant and wire 19 is fed at a uniform rate, it is probable that the fill height of the deposited material or weld bead 39 will not remain constant at an optimum value. The reason for this is that cost considerations usually prevent shaping of the edges of the workpieces 13 and 13' with sufficient precision to assure that the groove 14 is of precisely uniform configuration all along the juncture between the two workpieces. At places where the fill groove 14 widens out slightly, the depth of the deposited material 39 will decrease under the conditions described above while at places where the fill groove narrows, the depth of the deposited material becomes greater than normal and an overfill condition results.

The present invention overcomes this problem and maintains a constant fill height of the deposited material or weld 39 by sensing departures from a predetermined height from variations of the weld arc current which accompany such departures and by then speeding or slowing the rate of travel of welding head 16 along the fill groove 14 in order to deposit more or less material at each point as required to maintain a constant fill height.

Considering now an example of a suitable control network 40 for this purpose, inputs 41 and 42 of an operational amplifier 43 are connected to opposite ends of the resistor 34 in order to produce a first signal at the amplifier output 44 that has a magnitude which varies in accordance with variations of the arc current between electrode wire 19 and workpieces 13. If the spacing between the contact 35 and the pool 39' at weld 39 increases, the resistance in the primary welding circuit is increased. The voltage drop across resistor 34 decreases accordingly since the resistor and the current path between contact 35 and pool 39' are in effect a voltage divider. This decrease causes the voltage at amplifier input 41 to become more positive. Conversely, if the distance between contact 35 and weld pool 39' decreases because of a rise in the height of the weld pool 39' the voltage drop across this distance decreases causing an increased voltage drop acros resistor 34. Amplifier input 41 then becomes less positive. The voltage at the reference input 42 of the amplifier remains constant since it is connected directly to the regulated voltage power supply 30. The output voltage of amplifier 43 is proportional to the difference of the voltages at inputs 41 and 42 and thus changes accordingly, although the output voltage or first signal is inverted in accordance with the well-known characteristics of such operational amplifiers. Thus the first signal on output conductor 44 becomes more negative when the height of the weld pool 39' starts to increase and becomes less negative if the height of the weld pool decreases.

The first signal from amplifier 43 is applied to a summing junction 46. A reference signal source 47 providing a selectable positive DC voltage is also connected to summing junction 46. Reference signal source 47 may take any of various forms and in this example consists of a DC power supply 48 having the negative side grounded and a potentiometer 49 connected across the voltage supply and having an adjustable tap 51 connected to summing junction 46. Thus, it may be seen that the voltage at summing junction 46 is the algebraic sum of the negative first signal received from amplifier 43 and the positive reference signal received from reference source 47. For any given setting of the reference signal source potentiometer 49, there exists some fill height of the weld at which the two voltages applied to summing junction 46 cancel out. This weld fill height may be changed as desired by adjustment of the movable tap 51 of the potentiometer 49, and the system functions to maintain the fill height at a value which is selected in this manner.

To provide the automatic control, the voltage at summing junction 46 is applied to one terminal 52 of a servomotor 53 through another amplifier 54, the other terminal 56 of the servomotor being grounded. Servomotor 53 in this example is a reversible DC electrical motor of the form which turns in one direction in response to a positive voltage and in the opposite direction in response to a negative voltage.

The variable resistance 32 which controls the speed of travel motor 21 and which has been briefly referred to above differs from that employed in prior installations for controlling travel rate. Variable resistance 32 includes a first resistive element 57 and a second resistive element 58 connected in series between output terminals 29 and 27 of the travel motor power supply 26. A first movable contact 59, adjustable along the length of resistive element 57, connects the terminal 31 of travel motor 21 with any selectable point along resistive element 57. Thus, resistive element 57 and movable contact 59 are essentially a potentiometer for applying selectable voltage to travel motor 21 and this provides a means for varying the speed of the motor and for thereby varying the speed of movement of welding head 16 along fill groove 14. Another contact 61 is movable along the second resistive element 58 and is connected to the other travel motor power supply terminal 27. Contact 61 in conjunction with resistive element 58 thus constitutes a potentiometer connected as a rheostat and as will hereinafter be discussed in connection with the operation of the invention provide for selection of a predetermined minimum speed for the welding head 16 irrespective of the fill height of the weld 39.

In order to automatically adjust movable contact 59 as necessary to maintain a constant fill height of the weld 39, the output shaft 62 of servomotor 53 is mechanically coupled to contact 59 through a speed reduction gearing 63 to shift the movable contact along the resistive element to thereby vary the speed of travel motor 21 when necessary for this purpose. In this example the speed reduction mechanism 63 consists of a worm gear 64 driven by servomotor output shaft 62 and which is engaged by a spur gear 66. Spur gear 66 is coupled to the movable contact 59 to turn the contact along the arcuate resistive element 57 in response to motor operation. Thus, operation of servomotor 53 in one direction decreases the voltage applied across travel motor terminals 31 and 28 while servomotor operation in the opposite direction increases the voltage applied to the travel motor.

To confine movement of contact 59 to the limits of resistive element 57, rotation limiting means 67 are provided. In this example, means 67 is provided for by cutting away a portion 68 of the rim of the spur gear 66 to provide two radially directed shoulders 69 on the spur gear which are angularly spaced apart by an amount corresponding to the maximum possible angular travel of movable contact 59 along the annular resistive element 57. A fixed stop element 71 extends into cutout portion 68 to block further rotation of the spur gear, by abutment against one or the other of the shoulders 69, when either of the limits of travel is reached. Servomotor 53 is a low torque, high resistance motor of the form which does not overheat or draw excessive current when stalled.

Considering now the operation of the above described system, a welding operation is commenced at installation 11 by first energizing the welding current power supply 32, the travel motor power supply 26 and the wire feed drive motor 20 in the conventional manner. However, in contrast to conventional systems, the desired fill height of the weld 39 is selected by adjustment of movable contact 51 of the reference signal source 47 and is thereafter automatically maintained by the present system at the selected value. If the fill height of weld pool 39' is at the desired value at any given time, the output signal from current sensing amplifier 43 is cancelled at summing junction 46 by the opposite polarity reference signal from source 47. Under this condition no input voltage is applied to terminal 52 of servomotor 53. Thus, movable contact 59 of variable resistance 32 remains stationary and a constant voltage continues to be applied to travel motor 21 to maintain the travel rate of the welding head 16 along groove 14 constant.

If, at a particular time, the height of the weld pool 39' in groove 14 should increase, due to the presence of a relatively narrow portion of the groove 14 at some point along the length thereof or because of other causes, the resistance of the electrical welding arc decreases causing the voltage at amplifier input 41 to become less positive. This causes the inverted first signal voltage at the output 44 of the amplifier 43 to become more negative and this increased negative voltage is applied to the summing junction 46. However, the positive voltage applied to the summing junction from reference signal source 47 remains constant and thus no longer cancels out the negative voltage at the summing junction. Consequently, a positive voltage is applied to terminal 52 of servomotor 53 through amplifier 54. This actuates the servomotor to turn movable contact 59 through speed reduction gearing 63 in the direction which increases the voltage applied to the terminals of travel motor 21 and which thereby increases the speed of the movement of welding head 16 along fill groove 14. The increased speed of welding head 16 causes the weld material which is being deposited from electrode wire 19 to be more spread out along groove 14 thereby diminishing the fill height until the desired predetermined fill height is re-established.

Conversely, if the fill height should start to decrease due to a relatively wide portion of groove 14 or other causes, the voltage at amplifier input 41 becomes more positive causing the first signal applied to summing junction 46 to become less negative. As the positive reference voltage applied to the summing junction remains constant, a negative voltage is applied to servomotor terminal 52. This causes the servomotor to move contact 59 to decrease the voltage applied to travel motor 21. The resulting decrease in the rate of movement of welding head 16 along groove 14 causes additional weld material to be deposited at each incremental portion of the groove thereby restoring the height of the weld to the predetermined desired value.

These actions of the system in correcting for any incipient departure of the weld height from the predetermined value are sufficiently fast that for practical purposes the height of the weld is maintained constant.

It will be apparent that the operator may at his discretion manually adjust contact 51 of the reference signal source to manually control the fill height and thereby override the automatic system. It should also be observed that the motion limiting means 67 prevents the automatic system from driving movable contact 59 past the limits of resistive element 57. These limits, which are essentially limits on the variations of the rate of movement of welding head 16 along groove 14, may be preestablished by an appropriate selection of the resistance for element 57 and are made sufficiently high and low to enable the system to compensate for all normal variations of the configuration of groove 14 that are likely to be encountered, without reaching the point of abutment of either shoulder 69 of spur gear 63 against stop 71. However, if that should occur due to gross irregularity in the configuration of the weld groove 14, the welding head 16 continues to travel at the preestablished minimum or maximum rate and thus the irregularity is eventually passed.

Instances arise in many arc welding operations at which the pool of molten material at the weld 39 is wholly or partially depleted because of passage of the weld seam adjacent an edge or opening of the workpieces. This may allow the molten material to drain away. When this occurs, weld fill height decreases abruptly and the present system reacts by slowing the movement of welding head 16 in an attempt to maintain the predetermined desired fill height as described above. Excessive slowing or stopping of movement of the welding head under these conditions would be highly undesirable. An excessive amount of welding material might be lost and there would be a risk of damage to the workpieces by excessive melting away of portions of the groove 14. This is avoided in that the automatic system cannot slow welding head movement below the predetermined lower limit discussed above. Further, this lower limit may be adjusted as desired to accommodate to characteristics of different types of workpieces, by adjustment of the movable contact 61 which is in effect a minimum travel rate selector. Thus, in the system as depicted in the drawing minimum voltage is applied to the travel rate motor 21 when movable contact 59 has been turned clockwise to the right end of resistive element 57. If the right end of resistive element 57 were connected directly to motor power supply output 27, this minimum voltage to the travel motor would be zero and stoppage of the welding head 16 would result. If the right end of resistive element 57 was connected to terminal 28, the minimum voltage applied to the motor would not be adjustable to suit different workpieces but would be determined by the internal resistance of the motor itself. However, in the present arrangement as depicted in the drawing and described above, the minimum voltage transmitted to the travel motor can itself be adjusted by adjustment of movable contact 61. The maximum voltage which is to be transmitted to the travel motor is established by the power supply 26 itself.

While the invention has been described with respect to one exemplary embodiment, it will be apparent that many modifications are possible and it is not intended to limit the invention except as defined in the following claims.

What is claimed is:

1. In an electrical arc welding apparatus, the combination comprising:

a welding head having means for supporting consumable welding material in spaced apart relationship to a juncture between workpieces which are to be joined, an electrical travel motor coupled to said welding head for producing relative motion between said welding head and said workpieces in a direction parallel to said juncture, a travel motor power supply, a travel rate control means for said travel motor including a variable resistance having a first resistive element connected between said travel motor and said travel motor power supply and having a first movable contact which may be adjusted to vary the voltage applied to said travel motor from said travel motor power supply to vary the speed of said relative movement, a welding current power supply for creating an electrical arc between said welding material and said workpieces to cause welding material to be melted and deposited along said juncture, a first signal source coupled to the current path between said welding current power supply and said welding material and said workpieces and having means for producing a first signal which has a magnitude varying in accordance with variations of current flow in said path, a reference signal source having means for producing a reference signal of predetermined selectable magnitude and of opposite polarity from said first signal, a summing junction coupled to said first signal source and to said reference signal source for producing a summation signal having a magnitude and polarity equal to the algebraic sum of said first signal and said reference signal, servomeans coupled between said summing junction and said travel rate control element for increasing the speed of said travel motor in response to summation signals of a first polarity and for decreasing the speed of said travel motor in response to summation signals of opposite polarity, said servomeans including a servomotor coupled to said first movable contact of said variable resistance and responsive to said summation signals from said summing junction to increase the voltage applied to said travel motor in response to summation signals of a first polarity and to decrease the voltage applied to said travel motor in response to summation signals of opposite polarity, and minimum travel rate establishing means coupled to said travel rate control for maintaining said speed of said travel motor at least equal to a predetermined minimum value irrespective of the action of said servomeans.

2. The combination defined in claim 1 further comprising motion limiting means between said servo motor and said first movable contact of said variable resistance for limiting movement of said first movable contact between predetermined limits.

3. The combination defined in claim 1 wherein said travel motor power supply has a first terminal connected to a first terminal of said travel motor, and wherein said first resistive element is connected between a second terminal of said motor power supply and said first terminal thereof in series relationship with a second resistive element and wherein said first movable contact of said variable resistance is connected to a second terminal of said travel motor, and wherein said minimum travel rate establishing means comprises a second movable contact connected to said first terminal of said motor power supply and said first terminal of said travel motor and being movable along said second resistive element to adjust the effective resistance thereof thereby establishing a selectable lower limit to the voltage which is applied to said travel motor irrespective of the operation of said servomeans.

4. The combination defined in claim 1 further comprising a current sensing resistor series connected into the current path between said welding current supply and said welding material and said workpieces and wherein said first signal source comprises an operational amplifier having a pair of input terminals connected to opposite ends of said current sensing resistor and having an output terminal connected to said summing junction, and wherein said reference signal source comprises a selectable DC voltage source also connected to said summing junction and wherein said servo means comprises a DC electrical servo motor having an output shaft and having a power terminal and being of the form which turns said output shaft in a first direction in response to a voltage at said power terminal of first polarity and which turns said output shaft in an opposite direction in response to a voltage at said power terminal of opposite polarity, means for applying a voltage to said power terminal of said servo motor in response to the presence of a voltage at said summing junction and means for reversing the polarity of the voltage applied to said power terminal when the voltage at said summing junction reverses, and a speed reducing mechanism coupled between said output shaft of said servo motor and said first movable contact of said variable resistance.

* * * * *